Oct. 8, 1957

H. H. EAGER ET AL 2,808,859

DISPENSING DEVICE

Filed March 19, 1954

INVENTOR
HERBERT H. EAGER
EARL E. HEINZELMAN

ATTORNEY

Oct. 8, 1957  H. H. EAGER ET AL  2,808,859
DISPENSING DEVICE
Filed March 19, 1954  2 Sheets-Sheet 2
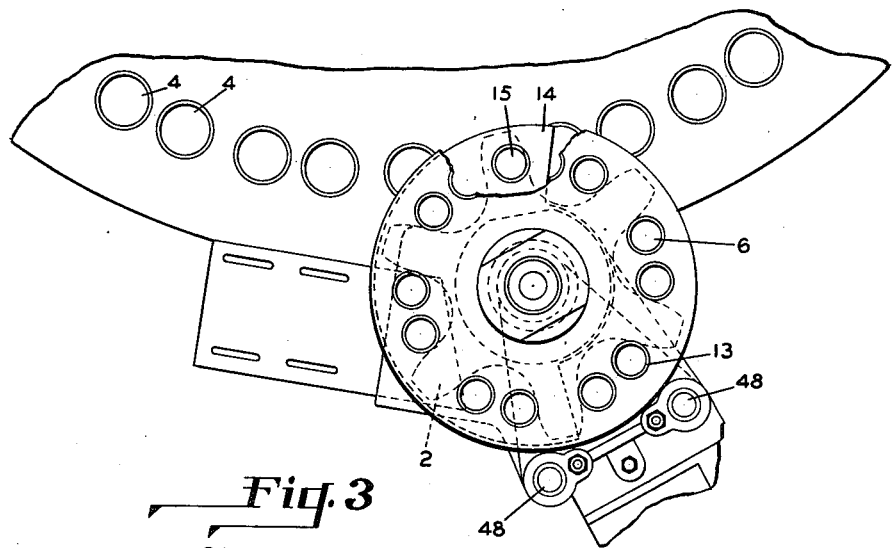
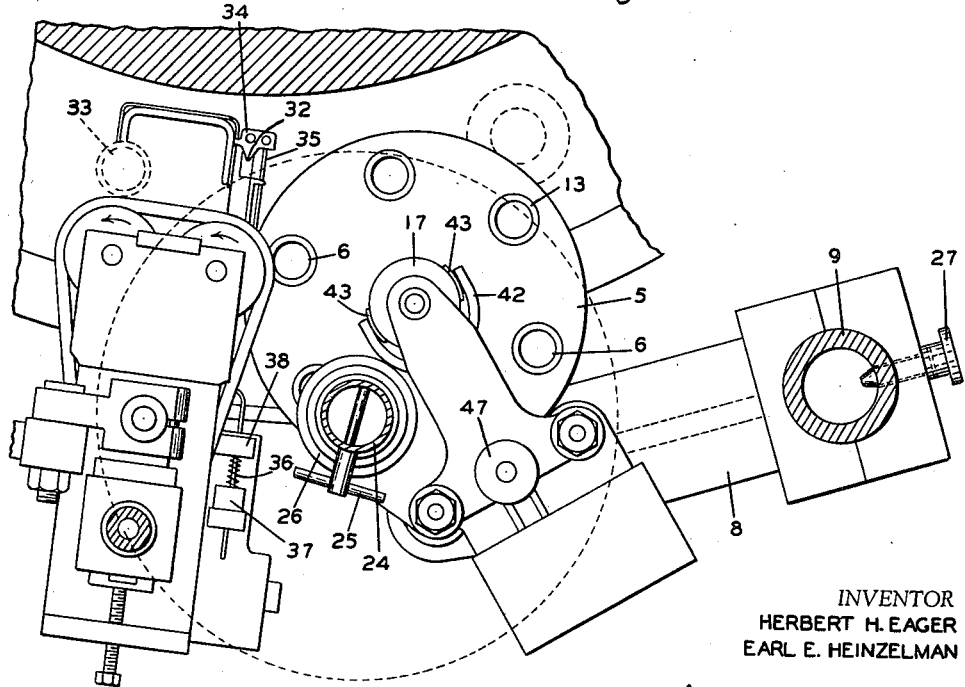
INVENTOR
HERBERT H. EAGER
EARL E. HEINZELMAN
ATTORNEY

United States Patent Office 2,808,859
Patented Oct. 8, 1957

2,808,859

DISPENSING DEVICE

Herbert H. Eager and Earl E. Heinzelman, Manheim Township, Lancaster County, Pa., assignors to Armstrong Cork Company, Lancaster, Pa., a corporation of Pennsylvania Application March 19, 1954, Serial No. 417,364

5 Claims. (Cl. 141—144)

This invention relates to a dispensing mechanism, and more particularly to the dispensing mechanism for supplying thermosetting molding compositions to high-speed rotary molding equipment utilized in the manufacture of molded bottle caps, buttons, tube bases, etc.

In supplying molding composition to rotary molding machines, it has been common practice to utilize a reciprocatory shuttle arrangement in which a charge of molding composition is transferred from a supply hopper into a chamber in said shuttle, and this chamber is moved into the path of travel of the mold cavity in the rotary molding machine. This movement of the shuttle is at approximately right angles with respect to the direction of movement of the mold cavity. Due to the high speed at which rotary molding machines are operated, it is necessary to operate this reciprocatory supply device at a very high rate of speed, and a certain amount of powder is spilled on each dispensing operation. This powder spillage over a period of time amounts to a considerable loss in molding composition.

An object of the present invention is to provide a dial or rotary dispenser having a plurality of chambers which are rotated about a central axis in a manner similar to the manner in which the mold cavities of a molding machine rotate about the central axis of the machine so that the dispenser can operate at a much slower rate of travel and the dispenser can travel with the mold cavity, thereby permitting a greater period of time for the molding composition to drop from the dispenser into the mold cavity and also permitting a greater period of time for the molding composition to drop from the hopper into the chamber in the dispenser. With this arrangement, the molding powder is distributed more uniformly in the mold cavity and all of the powder is conveyed to the mold cavity with no spillage.

In order that this invention may be more readily understood, it will be described in connection with the attached drawings, in which:

Figure 3 is a top plan view of the device; and

Figure 4 is a modification of the chamber arrangement.

Figure 1:
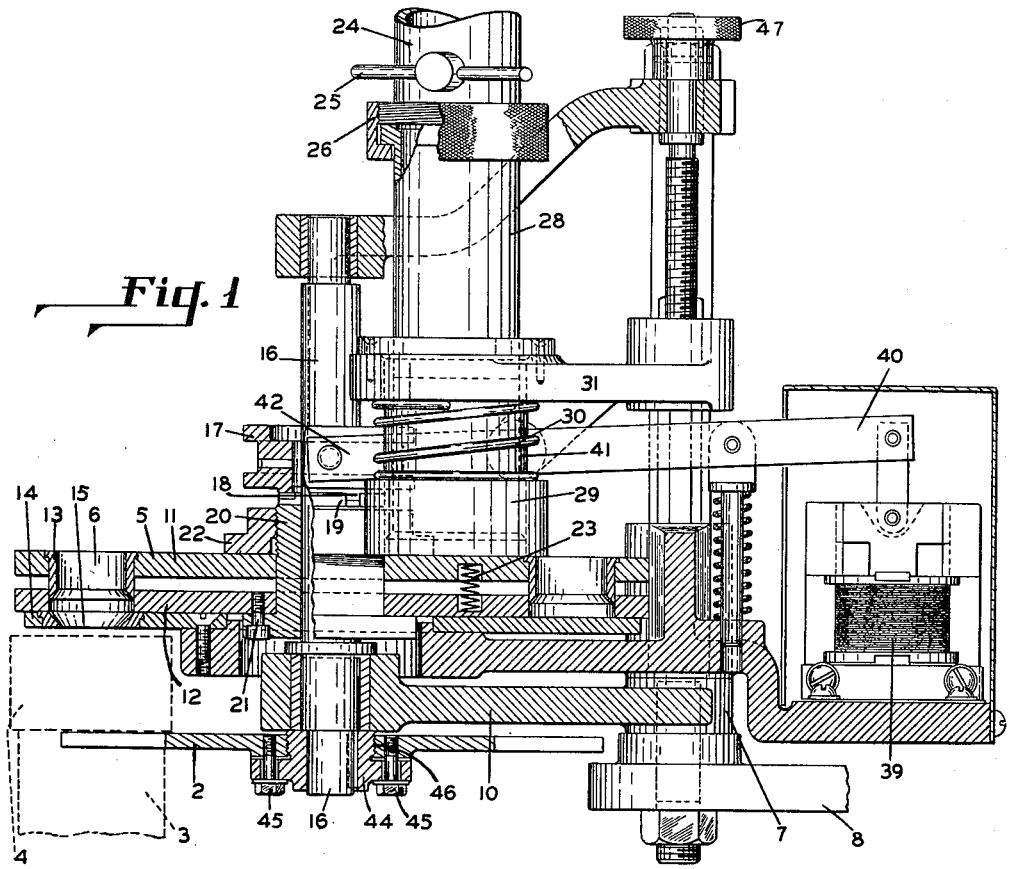
Figure 1 is a cross-sectional view showing the working of the dispenser.
Figure 2:
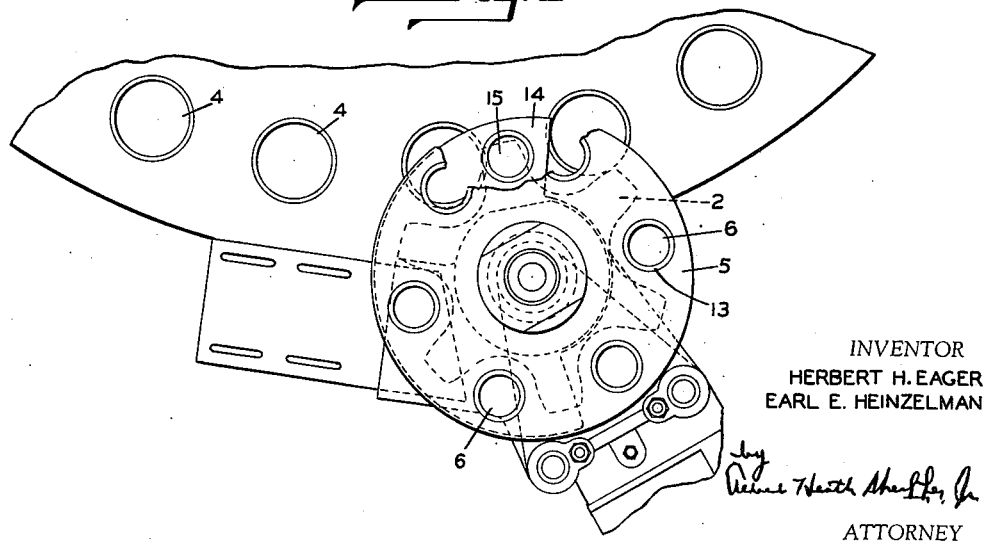
Figure 2 shows the position of the dispenser with respect to the rotary die block of a conventional rotary molding machine.

Referring to Figure 2, there is shown a star wheel 2 designed to be engaged by the plungers 3 carrying the mold cavities 4. The star wheel 2 is so designed that each plunger 3 will engage the star wheel and move the wheel one-sixth of a revolution. The dispenser dial 5 is provided with six chambers 6. The drive ratio between the star wheel 2 and the dial 5 is 1:1. Therefore, each one-sixth revolution of the star wheel will move the chambers 6 one-sixth of a revolution and bring them into alignment with the mold cavities 4. The relationship between the chamber 6 in the dial 5 and the mold cavity 4 carried by the die block of the rotary molding machine is such that for each one-sixth revolution of the dispenser dial a consecutive mold cavity carried by the die block will be moved into position with the dispenser. The dispenser assembly is mounted on a central column 7 which is supported on a bracket 8, mounted on the upright column 9 of the molding machine. The star wheel 2 is positioned beneath an arm 10 extending from the central column 7 and carrying the dispenser dial 5. The dispenser dial 5 is comprised of two plates 11 and 12. The chambers 6 are formed by bushings 13 which extend between the two plates 11 and 12. The bottom plate 12 slides over a plate 14 which is provided with an opening 15. This opening 15 in plate 14 is so positioned that it will be directly under one of the chambers 6 in the dial 5 at the time that one of the mold cavities 4 on the molding machine is in alignment with the chamber 6 in the dispenser dial. In other words, powder can only be transferred from the chamber 6 in the dispenser dial 5 to the mold cavity 4 on the machine when the two are in alignment with the opening 15 in the stationary plate 14.

Rotary movement is transmitted to the dispenser dial 5 from the star wheel 2 through the central shaft 16 to which the star wheel 2 is keyed. This central shaft 16 has a pulley 17 keyed thereto. This pulley 17 is free to move vertically on shaft 16 but is keyed to the shaft to rotate therewith. The pulley 17 carries six teeth 18 on its bottom edge which are adapted to engage six teeth 19 on the top surface of sleeve 20 which surrounds shaft 16. The bottom plate 12 of the dial dispenser is attached to the sleeve 20 by means of studs 21. The movement imparted to plate 12 is transmitted to plate 11 through the bushings 13 in the chamber 6. By this arrangement, when the teeth 18 of the pulley 17 are in engagement with the teeth 19 on the sleeve 20, rotary movement imparted to the star wheel 2 will be transmitted to the dial 5 and one-sixth revolution of the star wheel 2 will move the dial 5 one-sixth of a revolution, or the distance between two chambers 6 in the dial. The spacing between the chambers 6 on the dial 5 and the spacing between the mold cavities 4 on the rotary molding machine is such that as the dial 5 moves one-sixth of a revolution the die block of the rotary molding machine will advance the distance between two adjacent mold cavities. In order for the dispenser to operate properly, it is essential that the number of teeth on the pulley and sleeve correspond to the number of chambers in the dispenser dial 5.

The dial is comprised of two plates in juxtaposition to accommodate molding powder charges of varying size required for making molded articles of various size. If it be desirable to diminish the quantity of molding powder supplied to the chamber, this can be accomplished by moving the two plates 11 and 12 closer together, in which case the bushing 13 will merely slide down into the opening of the lower plate 12 and the chamber 6 will thereby have less powder-carrying capacity. This adjustment is made by means of the ring nut 22, which is in threaded engagement with the sleeve 20 and may be raised and lowered by means of a wrench. Downward movement of the nut 22 will force the top plate 11 in a downward direction. When the nut 22 is moved upwardly, plate 11 will move upwardly by means of springs 23, which are disposed between the two plates and compressed when the plates are moved together and expanded when the pressure is released.

The molding powder to be supplied to the machine to which this device is attached is stored in a hopper above the device and is fed by gravity down through a tube 24 provided with a butterfly valve controlled by the handle 25. The hopper is attached to the dispensing device by means of a threaded coupling 26 so that the hopper and dispenser can be disconnected and the dispenser moved out of position by swinging the bracket 8 around column 9. The dispenser is held in proper position with respect to the die block of the rotary molding machine during normal operation by means of pin 27, which fits in a recess in column 9.

The tube 24 feeds into a telescoping tube 28 which directs the powder to the chambers 6 carried by the dial 5. The lower extremity of tube 28 is provided with a spring-urged shoe 29. The spring 30 is compressed between the horizontal member 31 and the shoe 29 to insure constant engagement of the shoe 29 with the polished chromium surface of the dial 5. This spring pressure gives proper wiping action between the shoe and the dial to insure the proper loading of the chamber 6 without powder spillage.

During the molding of articles on rotary molding machines, occasionally due to the fact that the molded article sticks to the force plug to such an extent that it is not removed by the unscrewing device, it is necessary to halt the dispenser so that a charge of molding powder is not supplied to the complementary mold cavity so that the force plug carrying the unremoved molded article is not forced down into a mold cavity containing a new charge of molding composition. In order to accomplish this, a detector 32 is positioned in the path of travel of the force plug 33 so that the force plug will pass the detector after the unscrewing operation has been performed. The positioning of the detector 32 is such that it will not be engaged by a force plug from which the molded article has been removed; but if a molded article is carried by the force plug 33, the molded article will engage the detector 32. The detector 32 is mounted on a bracket 34. A rod 35 is also attached to the bracket 34, and constant spring tension is applied to the rod 35 by means of spring 36 compressed between the collar 37 mounted on the rod and support 38 through which rod 35 passes. Engagement of the detector 32 by a molded article on the force plug 33 moves rod 35 sufficiently far to actuate a micro switch (not shown). The closing of the micro switch energizes solenoid 39, which exerts a downward movement on lever 40 pivoted about pivot point 41, raising yoke 42. The yoke 42 has two shoes 43 in engagement with the rotating pulley 17. Upward movement of the yoke 42 raises the pulley 17 on the shaft 16, disengaging the teeth 18 on the pulley 17 from the teeth 19 on the sleeve 20, permitting the star wheel 2 to make one-sixth of a revolution. Therefore, the complementary mold cavity to the force plug carrying the molded article will come in position under a stationary chamber in the dial 5 from which the charge was dumped into the preceding mold cavity.

This dispenser halting mechanism can also be utilized in producing molded articles on a rotary molding machine using a limited number of tools. Take, for example, a rotary molding machine having thirty molding stations. This could be utilized to produce articles in which only twenty-five sets of tools are available. In this case, the tools would be arranged in groups of five on the plungers of the rotary molding machine, and every sixth station would not carry a tool. The plunger on the station for which tools are not provided would be provided with a projection which engages a contact switch in a parallel electric circuit with the switch above referred to so that each time the plunger carrying the projection engages the contact switch, solenoid 39 will be operated in the manner above described and no mold charge would be fed to the station for which no tool is provided.

Certain molding operations require greater speeds than others. When the operation of the molding machine is increased in speed, it may be necessary to change the relative position between the star wheel 2 and the chambers 6 to insure that the molding powder is supplied to the mold cavity on the rotary molding machine at the proper time to prevent spillage on the edge of the mold cavity 4 of the rotary molding machine. This adjustment can be made by moving the star wheel 2 with respect to the shaft 16. The star wheel 2 is attached to a hub 44 which is keyed to the shaft 16. The attachment between the star wheel 2 and the hub 44 is through studs 45 and threads 46 carried on the star wheel and the hub. If it is found desirable to move the star wheel 2 slightly in order to bring the chambers in proper register, this is done by loosening studs 45, rotating star wheel 2 slightly, then tightening studs 45, which operate in grooves in the hub; and the proper adjustment can be made so that the star wheel 2 will bring the chambers 6 in the dial 5 into proper alignment with the mold cavities 4 on the molding machine.

In molding certain items, it may be necessary to raise the entire dispensing device to accommodate a deep cavity such as that utilized in making deep skirted closures. To do this it is necessary to raise the entire assembly. This is accomplished by the adjusting screw 47 which is in threaded engagement with the cross arm 31 which moves vertically on columns 48. This adjustment raises the entire assembly to the proper position; however, the star wheel 2 will remain in its same horizontal plane for engagement by the plungers on the rotary molding machine.

This type dispenser is suitable for operation where each station on the rotary molding machine carries only one mold cavity or where each station carries a multiple of mold cavities, such as, for example, two and three mold cavities. In this case, each station in the dial would have to have the complementary number of mold cavities to the number of mold cavities carried on each station on the rotary molding machine. Figure 4 shows a modification in which each station on the rotary molding machine has two mold cavities and each station on the dial 5 has two corresponding chambers. In order to have the dispenser operate at the proper speed with the speed of the mold cavity on the die block, it is necessary to change the contour of the star wheel so that the chambers in the dispenser dial will come in proper register with the mold cavities in the die block. Also, the spacing of the chambers in the dispenser dial cannot be uniform but will have to be spaced so that they will come in proper register with the mold cavities. It will be understood that with the particular arrangement of the star wheel, the dispenser dial is not rotated at a constant speed but, as a matter of fact, operates faster when it is not dumping powder into a mold cavity. The dial is at its lowest speed when one of the chambers 6 in the dial 5 is in alignment with the mold cavity 4 in the mold block. Because of this change of speed, the contour of the star wheel and the spacing of the chambers in the dial must be such as to bring the chambers in the dial into proper register with the mold cavities in the die block during normal operating speed of the rotary molding machine.

We claim:

1. In a device for supplying molding composition to a mold cavity traveling in a closed path on a rotary molding machine, the combination of a rotary carrier; a chamber on said carrier, said chamber containing a measured quantity of molding composition, the axis of rotation of the carrier being outside the circular path of travel of the rotary molding device, the arc of travel of the carrier intersecting the arc of travel of the molding machine in a limited area only, the plane of travel of the carrier being above the plane of travel of the mold cavity in the molding machine; and means for discharging the molding composition from the chamber in the carrier to the mold cavity when the two are in juxtaposition.

2. In a device for supplying molding composition to a plurality of mold cavities moving sequentially in a closed path on a rotary molding machine, the combination of a rotary carrier; a chamber on said carrier, said chamber containing a measured quantity of molding composition, the axis of rotation of the carrier being outside the circular path of travel of the rotary molding device, the arc of travel of the carrier intersecting the arc of travel of the molding machine in a limited area only, the plane of travel of the carrier being above the plane of travel of the mold cavity in the molding machine; means for rotating said carrier to bring the chamber in juxtaposition with the mold cavities of the rotary molding machine to transfer the predetermined quantity of material from the chamber to the mold cavity, said means for rotating said carrier being synchronized with the movement of the rotary molding machine; a clutch located between said rotating means and said carrier; and automatic means to operate said clutch to halt the rotation of the carrier and start rotation after it has been halted.

3. In a device for supplying molding composition to a mold cavity traveling in a closed path on a rotary molding machine, the combination of a rotary carrier; a chamber on said carrier, said chamber containing a measured quantity of molding composition, the axis of the rotation of the carrier being outside the circular path of travel of the rotary molding machine, the arc of travel of the carrier intersecting the arc of travel of the molding machine in a limited area only, the plane of travel of the carrier being above the plane of travel of the mold cavity in the molding machine; means for discharging the molding composition from the chamber in the carrier to the mold cavity when the two are in juxtaposition; and means for altering the volume of the chamber on the carrier.

4. In a device for supplying molding composition to a plurality of mold cavities traveling sequentially in a closed path on a rotary molding machine, the combination of a rotary carrier; a plurality of chambers on said carrier, said chambers containing a measured quantity of molding composition, the axis of rotation of the carrier being outside the circular path of travel of the rotary molding machine, the arc of travel of the carrier intersecting the arc of travel of the molding machine in a limited area only, the plane of travel of the carrier being above the plane of travel of the mold cavities in the molding machine; means for retaining the molding composition in the chambers in said carrier until one of the chambers is in juxtaposition with a mold cavity in said rotary molding machine; and means for driving said carrier in synchronization with said rotary molding machine.

5. In a device for supplying molding composition to a plurality of mold cavities traveling in a closed path on a rotary molding machine, the combination of a rotary carrier; a plurality of chambers on said carrier, said chambers containing a measured quantity of molding composition, the axis of rotation of the carrier being outside the circular path of travel of the rotary molding device, the arc of travel of the carrier intersecting the arc of travel of the molding machine in a limited area only, the plane of travel of the carrier being above the plane of travel of the mold cavities in the molding machine, the number of mold cavities on the molding machine being a multiple of the number of chambers in the carrier; means for discharging molding composition from a chamber in the carrier to a mold cavity when the two are in juxtaposition; and driving means to rotate said carrier in synchronization with said rotary molding machine.

References Cited in the file of this patent

UNITED STATES PATENTS

| | | |
|---|---|---|
| 1,233,261 | Munn | July 10, 1917 |
| 1,557,455 | Hansen | Oct. 13, 1925 |
| 1,734,166 | Hansen | Nov. 5, 1929 |
| 1,778,216 | Hansen | Oct. 14, 1930 |
| 2,158,769 | Ayars | May 16, 1939 |
| 2,639,076 | Kerr | May 19, 1953 |